D. KAHNWEILER.
Cotton Seed Huller.
No. 101,271. Patented March 29, 1870.
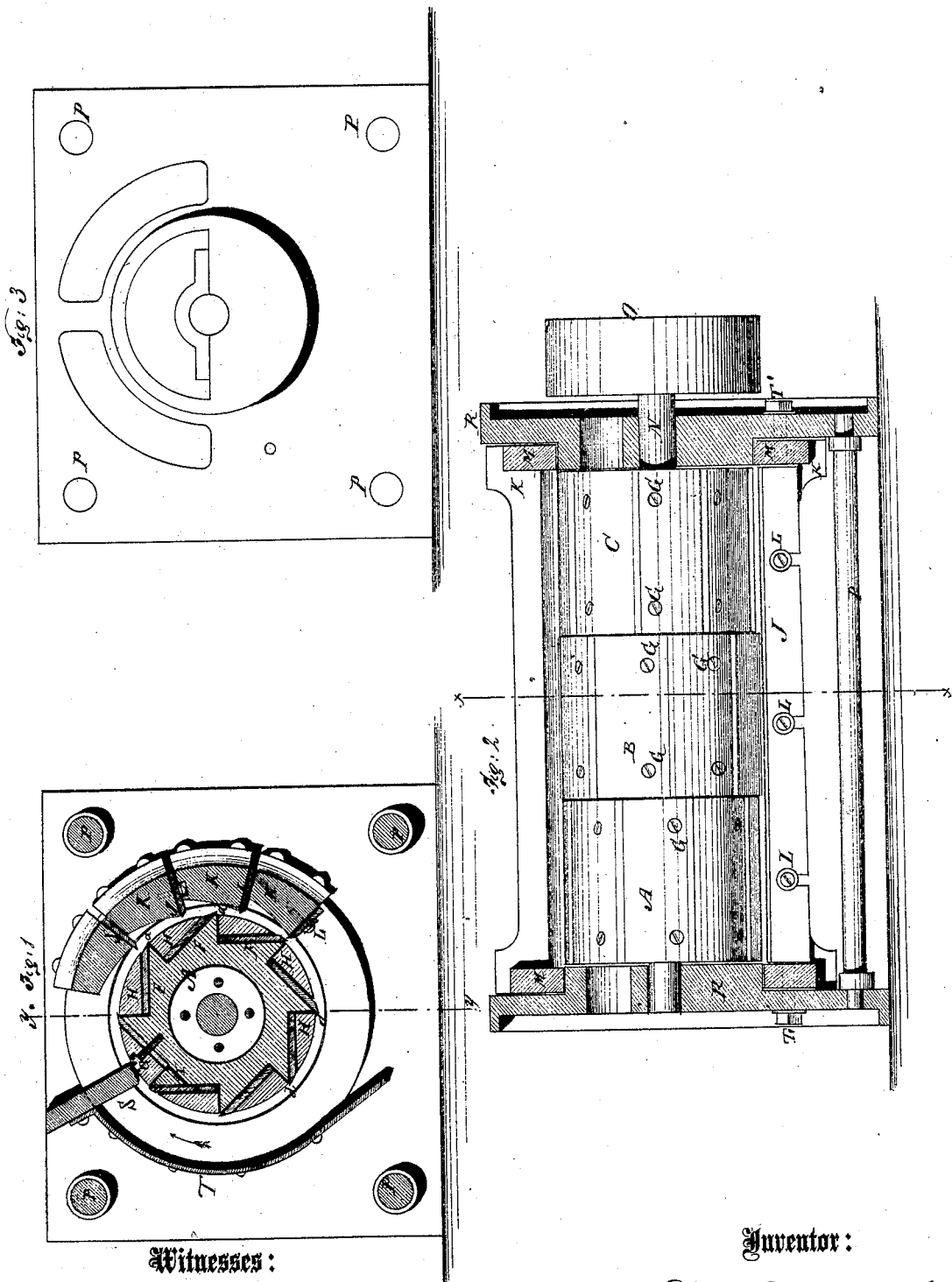

United States Patent Office.

DAVID KAHNWEILER, OF NEW YORK, N. Y.

Letters Patent No. 101,271, dated March 29, 1870.

---

IMPROVEMENT IN HULLING-MACHINES.

---

The Schedule referred to in these Letters Patent and making part of the same.

---

To all whom it may concern:

Be it known that I, DAVID KAHNWEILER, of New York city, in the county and State of New York, have invented a new and useful Improvement in Hulling-Machines; and I do hereby declare that the following is a full, clear, and exact description thereof, which will enable others skilled in the art to make and use the same, reference being had to the accompanying drawings forming part of this specification.

This invention consists in the arrangement and adjustment of the knives of the cylinder of a machine for hulling cotton-seed, and for other purposes, and in the formation of the cylinder and concave, and the parts connected therewith.

In the accompanying drawing—

Figure 1 represents a vertical cross section of fig. 2 on the line $x\ x$.

Figure 2 is a vertical longitudinal section of fig. 1 on the line $y\ y$.

Figure 3 is a detail view of the inside of one of the heads of the frame-work.

Similar letters of reference indicate corresponding parts.

A represents the revolving cylinder, which is divided into two or more longitudinal sections marked A, B and C.

Each section is provided with a set of knives or cutters, the working edges of which are seen at the points marked $d$.

Each section of the cylinder is rigidly attached to the shaft, and the knives are so arranged on their respective sections that those on each section have a different cut from either of the others, and so that in working on the seed, which is fed into the machine through a suitable hopper, only a single knife on one of the sections is cutting at one time, thus greatly lessening the power required for driving the ordinary hulling-machine.

As seen in the drawing, the knives F on the cylinder are fastened to the cylindrical sections by the screws G which pass through the blocks H.

These blocks serve to fill out the cylinder between the knives, as seen in the drawing.

I represents screws which are let into the cylinder, so that their ends bear against the backs of the knives, and so that by turning them, the knives may be set out from the surface of the cylinder. This method of fastening and adjusting the knives is plainly seen in the cross section, fig. 1. There are slots in the knives, through which the fastening screws pass, which allow of this adjustment.

J represents the knives of the concave, which are four (more or less) in number.

Each one is slotted, and connected to a bar, K, by the screws L, so that they may be adjusted to the cylinder in a proper manner.

The bars K are rigidly attached at each end to the inner rings M, on the ends of the frame.

N is the cylinder-shaft, which revolves on journals confined to the heads, as represented in fig. 3.

O is the pulley on the shaft, to which the power is applied.

P represents rods by which the ends R of the machine are connected together.

S is the base of the hopper, and

T is a sheet-metal apron by which the cylinder is partially surrounded, as seen in fig. 1.

The cylinder is driven in the direction of the arrow, and the seed and hulls or chaff which are cut and separated from the seed are thrown by the centrifugal force of the cylinder mainly against the apron T, from whence they are discharged.

By constructing the cylinder in longitudinal sections, as described, and arranging the knives on the sections so that only one cuts at a time, the machine is made more effective than ordinary hulling-machines, while the power required for driving it is greatly reduced from that ordinarily applied to machines used for hulling seed.

The bars K to which the concave knives are attached are made to move around the circular heads on the ends of the frame, and they are held in position by means of set-screws T'.

By thus moving the entire concave, the knives may be adjusted with the greatest facility.

Having thus described my invention,

I claim as new, and desire to secure by Letters Patent—

1. The combination of a series of knives, arranged on a cylinder, divided into two or more contiguous longitudinal sections, as shown and described, with a series of knives, J, separately adjustable, and having their cutting edges in the same diametrical plane, with the axis of the revolving cutter-stock, all as set forth.

2. The arrangement of set-screws I back of each knife in the recesses of the cutter-stock to adjust and form a back-rest for the tool, as shown and described.

The above specification of my invention signed by me this 26th day of November, 1869.

DAVID KAHNWEILER.

Witnesses:
 ALFRED LURCOTT,
 GEO. W. MABEE.